(12) United States Patent
Dickerson (10) Patent No.: US 11,083,548 B2
(45) Date of Patent: Aug. 10, 2021

(54) ORTHODONTIC ANTERIOR BITE PLATE

(71) Applicant: Todd Evan Dickerson, Phoenix, AZ (US)

(72) Inventor: Todd Evan Dickerson, Phoenix, AZ (US)

( * ) Notice: Subject to any disclaimer, the term of this patent is extended or adjusted under 35 U.S.C. 154(b) by 62 days.

(21) Appl. No.: 16/254,011

(22) Filed: Jan. 22, 2019

(65) Prior Publication Data
US 2019/0231488 A1 Aug. 1, 2019

Related U.S. Application Data

(63) Continuation-in-part of application No. 15/880,822, filed on Jan. 26, 2018, now abandoned.

(51) Int. Cl.
*A61C 7/36* (2006.01)
*A61C 7/14* (2006.01)
*A61C 7/00* (2006.01)

(52) U.S. Cl.
CPC .................. *A61C 7/36* (2013.01); *A61C 7/00* (2013.01); *A61C 7/14* (2013.01); *A61C 7/146* (2013.01)

(58) Field of Classification Search
CPC ........... A61C 7/36; A61C 7/145; A61C 7/146; A61C 7/10; A61C 7/00; A61C 7/14
See application file for complete search history.

(56) References Cited

U.S. PATENT DOCUMENTS

| | | | |
|---|---|---|---|
| 4,626,208 A | 12/1986 | Hall | |
| 4,793,803 A | 12/1988 | Martz | |
| 4,880,380 A | 11/1989 | Martz | |
| 4,915,630 A * | 4/1990 | Honig | A61C 5/007 433/215 |
| 5,098,288 A | 3/1992 | Kesling | |
| 5,145,364 A | 9/1992 | Martz et al. | |
| 5,439,379 A | 8/1995 | Hansen | |
| 5,863,198 A | 1/1999 | Doyle | |
| 5,957,686 A * | 9/1999 | Anthony | A61C 7/08 433/19 |
| 6,364,659 B1 * | 4/2002 | Lotte | A61C 7/00 433/18 |
| 6,464,494 B1 * | 10/2002 | Young | A61C 7/10 433/18 |
| 7,153,130 B2 | 12/2006 | Christoff | |

(Continued)

OTHER PUBLICATIONS

Search Report and Written Opinion in PCT/US2019/14773, 9 pages, dated Apr. 12, 2019.

*Primary Examiner* — Jacqueline T Johanas
*Assistant Examiner* — Shannel Nicole Belk
(74) *Attorney, Agent, or Firm* — Dorr, Carson & Birney PC (57) ABSTRACT

An orthodontic bite plate has a body with an anterior base for bonding attachment to the lingual surface of an upper anterior tooth, and an occlusal stop having an incisal surface extending across the lingual aspect of the body to limit upward movement of the patient's lower teeth. A vertical channel divides the body gingival to the occlusal stop into opposing lateral wings that are capable of being compressed together by application of a lateral compressive force to deform the base and thereby release the orthodontic bite plate from the tooth. At least one horizontal channel separates the occlusal stop and lateral wings. Optionally, the occlusal stop can include a vertical member that extends gingivally into the vertical channel between the lateral wings.

19 Claims, 6 Drawing Sheets

(56) References Cited

U.S. PATENT DOCUMENTS

| | | |
|---|---|---|
| 7,293,987 B2 | 11/2007 | Abels |
| 7,458,811 B2 | 12/2008 | Abels et al. |
| 9,402,695 B2 | 8/2016 | Curiel et al. |
| 9,844,424 B2 | 12/2017 | Wu et al. |
| 2005/0277082 A1 | 12/2005 | Christoff |
| 2006/0008761 A1 | 1/2006 | Allred |
| 2006/0127835 A1* | 6/2006 | Soo ................... A61C 7/146 433/4 |
| 2007/0087302 A1* | 4/2007 | Reising ............... A61C 7/145 433/24 |
| 2017/0156823 A1* | 6/2017 | Roein Peikar ......... A61C 7/10 |
| 2019/0336248 A1* | 11/2019 | Voudouris ............ A61C 7/14 |

* cited by examiner

ORTHODONTIC ANTERIOR BITE PLATE

RELATED APPLICATION

The present application is a continuation-in-part of the Applicant's U.S. Provisional patent application Ser. No. 15/880,822, entitled "Orthodontic Anterior Bite Ramp," filed on Jan. 26, 2018.

BACKGROUND OF THE INVENTION

Field of the Invention

The present invention relates generally to the field of orthodontic appliances. More specifically, the present invention discloses an orthodontic bite plate for use on anterior teeth.

Statement of the Problem

A deep bite is a common clinical presentation in orthodontics. In this condition, the lower anterior teeth are covered or concealed partially or entirely in the vertical direction because the upper anterior teeth overlap them. This deep bite is often due to the over-eruption of the lower anterior teeth.

Adding composite bonding material or some other material over the buccal surface of posterior teeth is a common way to disclude the upper and lower teeth. This is commonly referred to as a posterior "bite ramp" or "bite plate" and is the quickest, easiest way to separate teeth. Separation decreases or removes opposing teeth from touching one another. This disclusion artificially opens the bite so orthodontic brackets may be placed where it would otherwise not be possible to do so safely or comfortably. In addition, this protects the opposing dentition from forcefully coming into contact with the braces or brackets. Damage in the form of chipping and abrasion is avoided by having the teeth separated. The negative to using posterior bite ramps is that the point of first contact biomechanically has an intrusive force and effect on the posterior teeth, which results in an undesired extrusive effect on the lower anterior teeth.

In contrast, anterior bite ramps or bite plates are placed behind maxillary anterior teeth to disclude the posterior teeth. The lower anterior teeth contact the occlusal surface of the bite plate, thereby adding a vertical intrusive force in the direction that the mandibular teeth need to move to idealize alignment. The posterior disclusion facilitates easier eruption of posterior teeth. One eruption occurs and the bite ramps are removed, the posterior teeth contact earlier in the closing pattern, which lessens the vertical overlap or "overbite" of the anterior teeth. However, the problem with current anterior bite ramps is they are bulky and difficult to precisely position when using composite to fabricate either freehand or with a template. In addition, metal anterior bite plates are difficult to place and position for most orthodontists, so doctors rarely use these.

Unlike the facial aspect of teeth, the palatal aspects of the anterior teeth have extreme variability. This includes nearly flat to extremely pronounced marginal ridges, a flat to extremely concave bonding surface, small to interfering cingulum, and emergence profile differences between various shaped teeth ranging from palatal to facial presentations. It is extremely difficult to factor all of these individual variations when placing attachments on the palatal aspect of a tooth with current metal designs.

An even bigger problem with both composite-fabricated bite ramps and metal anterior bite plates is that they are extremely difficult and time-consuming to remove. Removal is hindered by the anatomical variation described above. Also, access on the palatal aspect of the anterior teeth makes most traditional removal techniques challenging at best, and useless at worst. In some cases, there is no alternative in metal anterior bite ramp removal other than grinding the bracket off, which is uncomfortable and time-consuming. The traditional torque removal technique used on brackets placed on the facial aspect of teeth is anatomically impossible in some cases, as is using a sharp lingual cutter and attempting to place the cutting edge at the tooth to the bonding pad surface. In the case of composite anterior bite ramps, the volume of composite to be removed is significant and time-consuming. There is such a large amount of composite to grind through in many cases, the dust generated may be detrimental to a patient's breathing and health.

The prior art in field of orthodontics also includes a variety of orthodontic brackets for engaging an archwire. These brackets generally have a structure and functionality that are quite different than a bite plate. Vertical slots are commonly used in such orthodontic brackets. The slot is as wide as possible to decrease the amount of bracket touching the orthodontic wire. The less wire-to-bracket contact, the less resistance the bracket has to movement of the wire, which in turn increases the ability of the wire to move teeth. The wide slot creates what are known as "wings" on the bracket on either side of the vertical slot. These wings are usually made as small as possible leaving enough undercut to allow an elastic tie to be engaged and hold an orthodontic wire in place.

Solution to the Problem

The present invention addresses these shortcomings in the field of orthodontic bite plates by providing a vertical slot on its lingual aspect that creates two opposing lateral wings. By including a vertical slot between the lateral wings in the bite plate, we are able to have the benefit of creating disclusion in the anterior, and add an intrusive effect when the mandibular teeth contact the bite plate. When the bite has been leveled to ideal, the bite plate can easily be removed by compressing the lateral wings to peel the bite plate from the tooth.

SUMMARY OF THE INVENTION

This invention provides an orthodontic bite plate having a body with an anterior base for bonding attachment to the lingual surface of an upper anterior tooth, and an occlusal stop having an incisal surface extending across the lingual aspect of the body to limit upward movement of the patient's lower teeth. A vertical channel divides the body gingival to the occlusal stop into opposing lateral wings that are capable of being compressed together by application of a lateral compressive force to deform the base and thereby release the orthodontic bite plate from the tooth. At least one horizontal channel separates the occlusal stop and lateral wings. Optionally, the occlusal stop can include a vertical member that extends gingivally into the vertical channel between the lateral wings.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
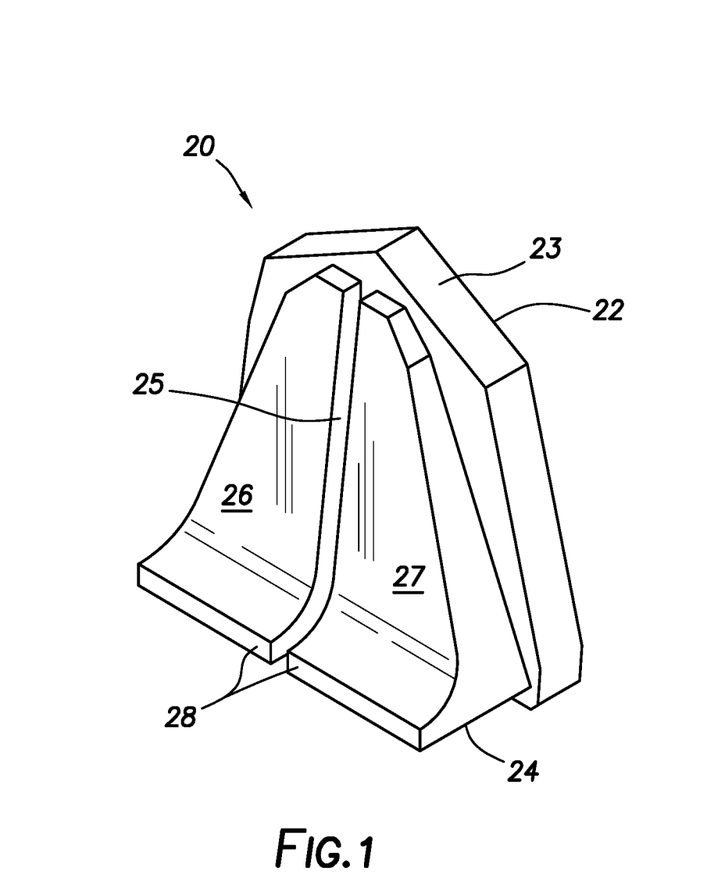
FIG. 1 is a top axonometric view of the bite ramp 20.
Figure 2:
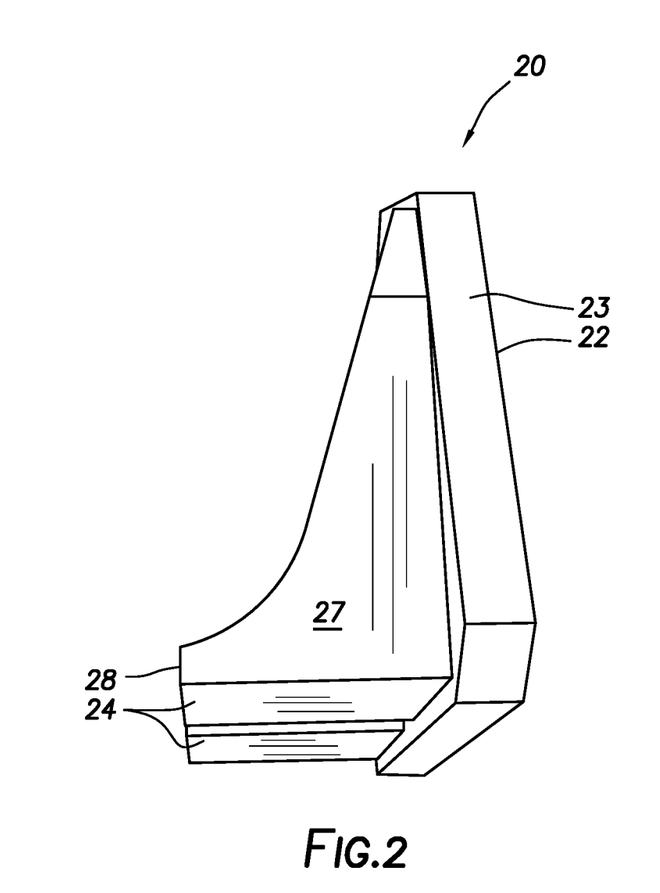
FIG. 2 is a bottom axonometric view of the bite ramp 20.
Figure 3:
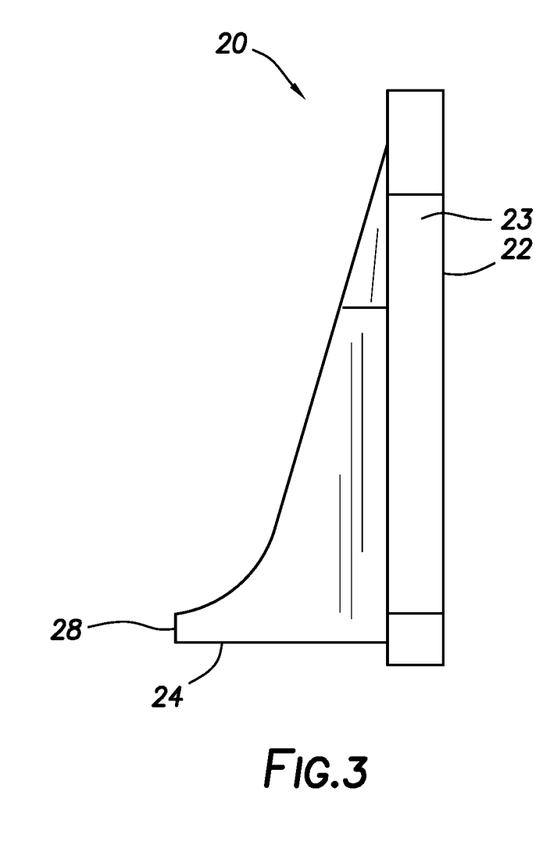
FIG. 3 is a right side axonometric view of the bite ramp 20 attached to an upper anterior tooth 10.
Figure 4:
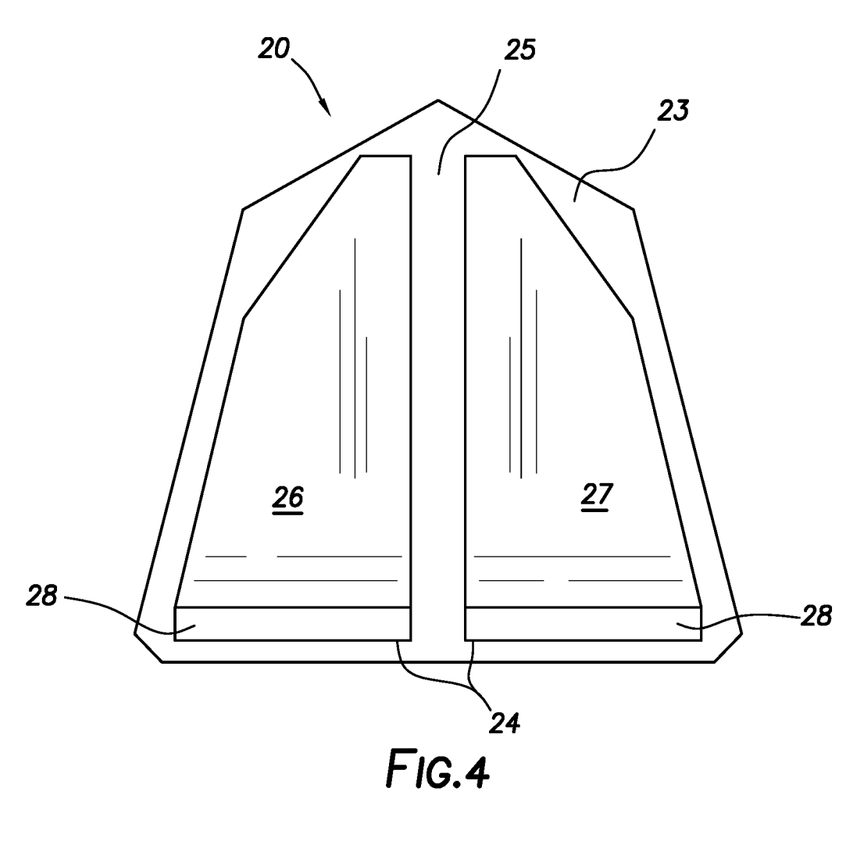
FIG. 4 is a rear view of the bite 20 attached to a tooth 10.

FIGS. 1 and 2 illustrate an embodiment of the bite ramp 20 in the present invention. The body of the bite ramp 20 includes a bonding base 22 on its anterior surface for bonding attachment to the lingual surface of a tooth 10. Typically, this would an upper anterior tooth. FIGS. 3 and 4 show the bite ramp 20 attached to the lingual surface of an anterior tooth 10. Optionally, the bonding base 22 can include a bonding pad 23 as shown in the accompanying figures that can be contoured to the profile of the lingual surface of the tooth 10. The bite ramp can be attached to the tooth 10 using cement, adhesive or other bonding agents. The bonding pad 23 can extend slightly beyond the edges of the bite ramp 20, as shown in the drawings. Alternatively, the bite ramp 20 could extend only to the edges of the bonding pad 23, or as close as possible to the edges of the bonding pad 23, to help ensure complete removal of the entire appliance from the tooth 10 in one piece.

Figure 5:
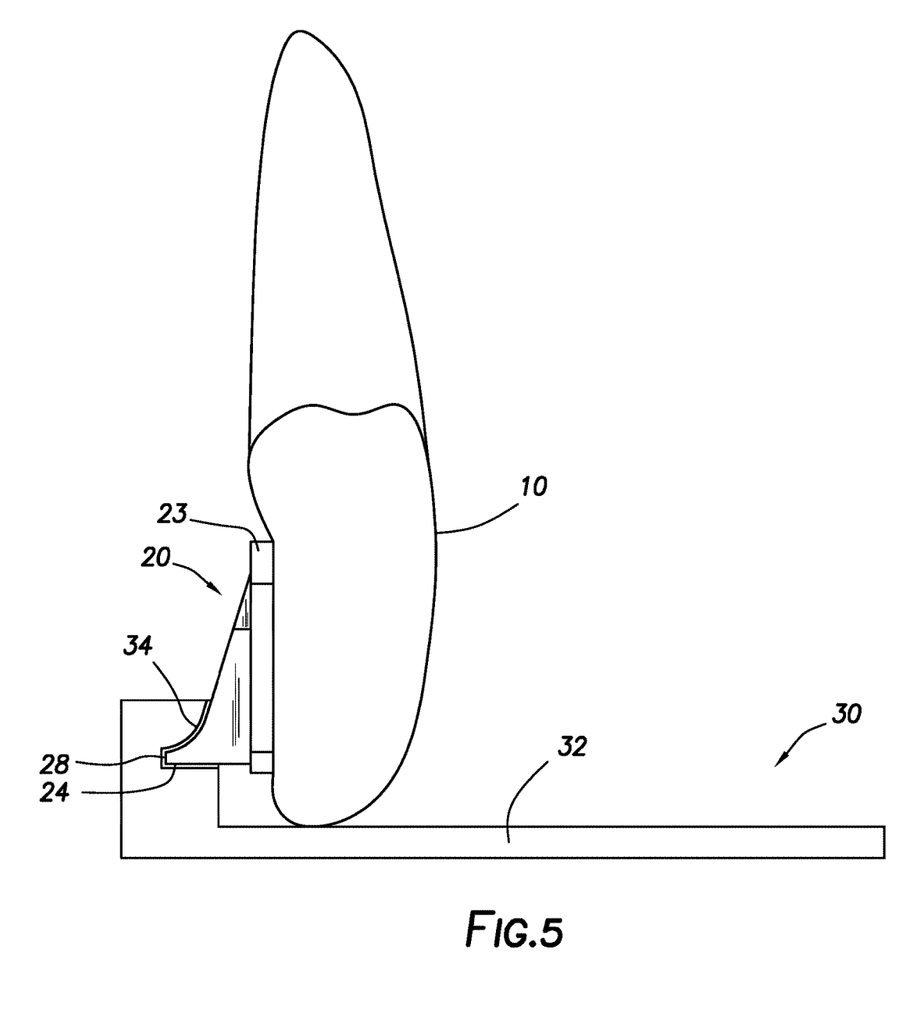
FIG. 5 is a right side view of a jig or gauge 30 being used to position a bite ramp 20 with respect to a tooth 10 during bonding.
Figure 6:
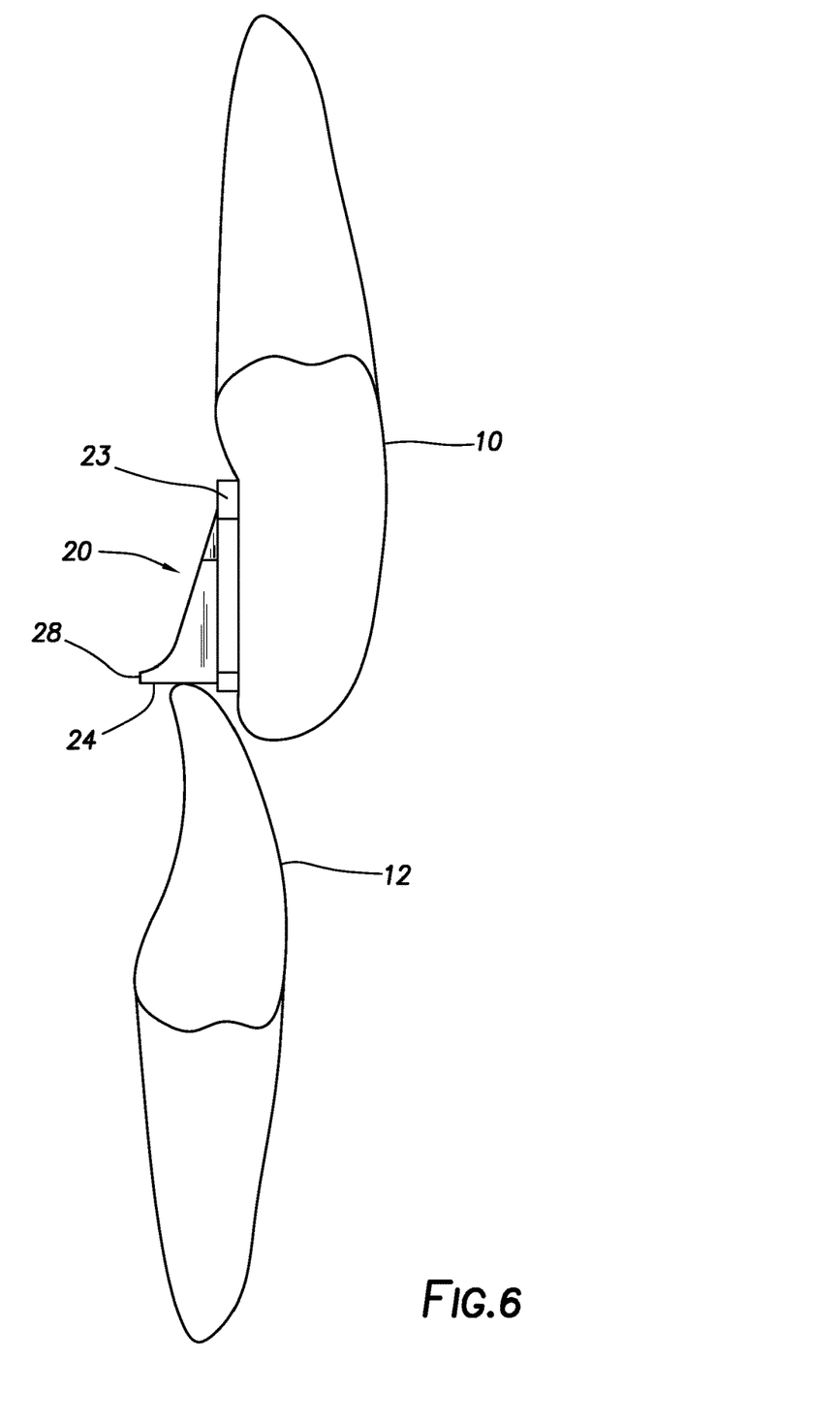
FIG. 6 is a right side view of the bite ramp 20 attached to an upper tooth 10 for limiting upward movement of a lower tooth 12.

The bite ramp 20 also has an occlusal or incisal surface 24 extending lingually from the bonding base 22 as shown in FIGS. 3-6. The occlusal surface 24 provides a stop to limit upward movement of the patient's lower teeth. As the mandible closes, the occlusal tip of a lower tooth 12 comes into contact with this occlusal surface 24 of the bite ramp 20 and thereby limits further upward movement of the jaw, as depicted in FIG. 6.

When viewed is a vertical plane normal to the bonding base 22, the bite ramp 20 can has a generally triangular shape with the hypotenuse running between the gingival end of the bonding base 22 and the lingual end of the incisal surface 24 to define the lingual aspect of the bite ramp 20. In other words, the bite ramp 20 is tapered from its bonding base 22 in a vertical plane normal to the bonding base 22 to its lingual edge 28 at the rear of the bite ramp 20.

A vertical slot 25 bisects this lingual aspect of the bite ramp 20 as illustrated in FIG. 4. Two opposing wings 26, 27 are defined on either side of this vertical slot 25. Preferably, the vertical slot 25 extends completely through the body of the bite ramp 20 to the bonding pad 23. Alternatively, the vertical slot 25 could extend only part of the way into the body of the bite ramp 20.

FIG. 5 is side view of a jig 30 being used to position a bite ramp 20 with respect to a tooth 10 during bonding. The jig 30 has an elongated horizontal arm 32 that contacts the tip of the tooth 10 to provide a fixed point of reference in setting the vertical elevation of the bite ramp 20 with respect to the tooth 10. The posterior portion of the jig 30 extends upward from the arm 32. A notch 34, recess or protrusion in the posterior portion of the jig 30 engages the lingual edge 28 of the bite ramp 20 so that the vertical elevation of the notch 34 above the top edge of the horizontal arm 32 determines the vertical position of the bite ramp 20 on the tooth 10.

Figure 7:
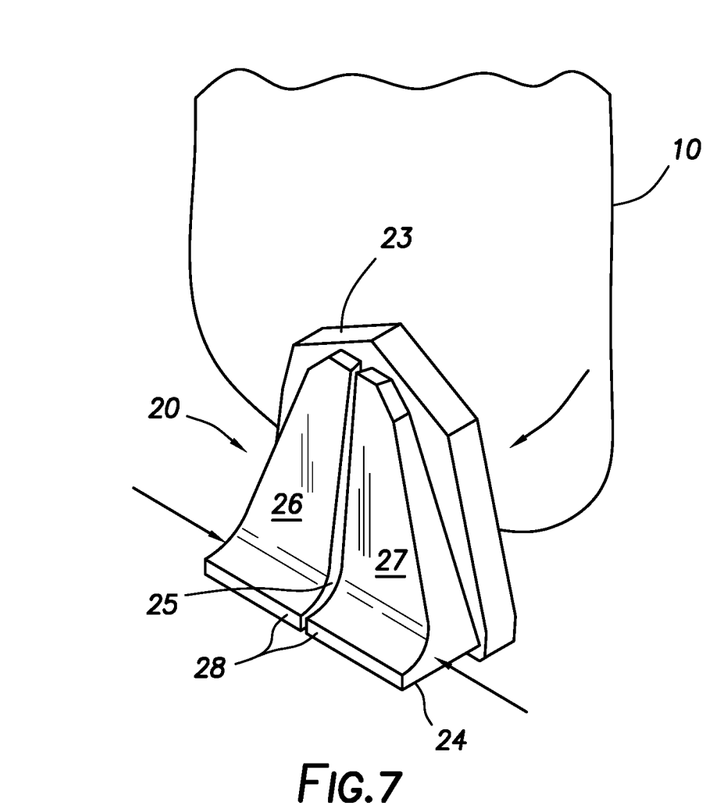
FIG. 7 is an axonometric view showing the wings 26, 27 of the bite ramp 20 being compressed to release the bit ramp 20 from the tooth 10.

After the bite ramp 20 has been bonded to a tooth 12, a period of orthodontic treatment follows. At the end of treatment, the bite ramp 20 must be removed. With the present invention, the doctor can quickly and easily remove the bite ramp 20 using pliers or the like to exert a lateral compressive force on the wings 26, 27. This squeezes the wings 26, 27 together and collapses the vertical slot 25. The bonding base 22 is deformed (e.g., the bonding pad 23 is peeled away from the tooth 10) in this process, thereby releasing the bite ramp 20 from the tooth 10. FIG. 7 shows the wings 26, 27 of the bite ramp 20 being compressed to release the bit ramp 20 from the tooth 10.

Figure 8:
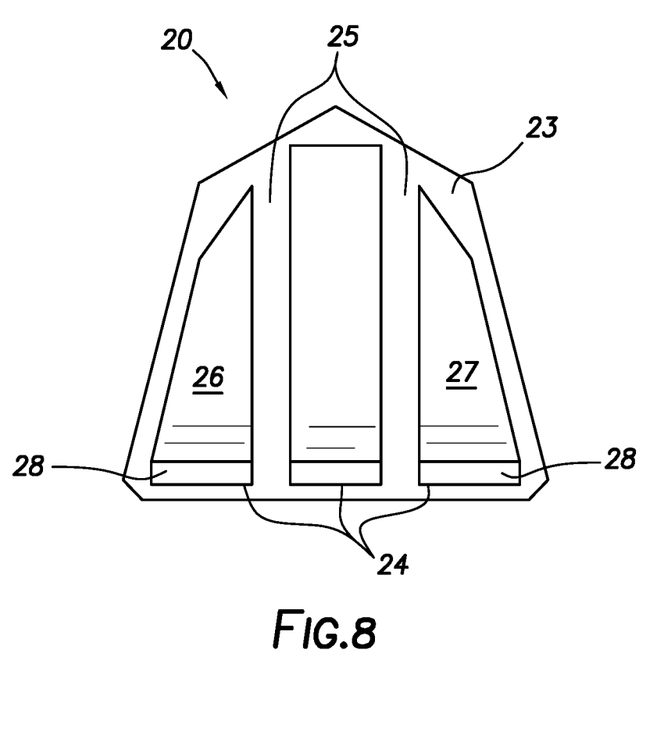
FIG. 8 is a rear view of an alternative embodiment of a bite ramp 20 having two vertical slots 25.

FIG. 8 is a rear view of an alternative embodiment of a bite ramp 20 having multiple vertical slots 25. In this embodiment, the vertical slots 25 run generally parallel to one another. Applying a lateral compressive force to squeeze the outermost wings 26, 27 collapses both of the vertical slots 25. This tends to lift the edges of the bonding pad 23 away from the tooth 10 to facilitate removal of the bite ramp 20.

Figure 9:
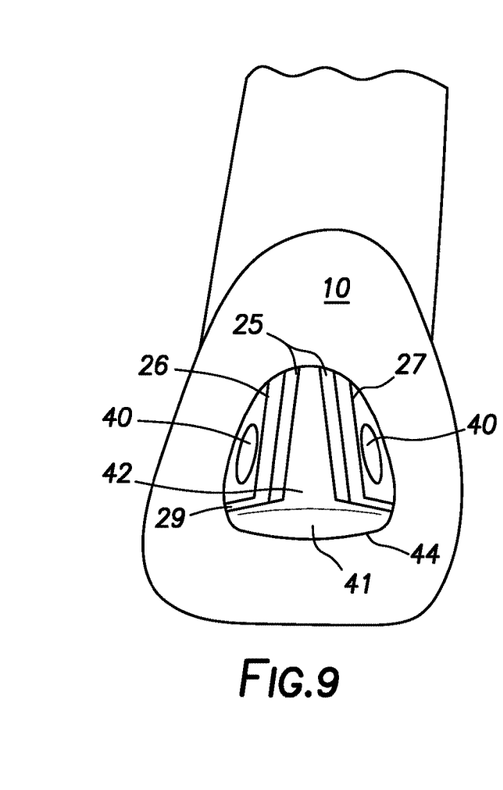
FIG. 9 is a rear view of an alternative embodiment of a bite plate 20 with an occlusal stop 41 attached to a tooth 10.
Figure 10:
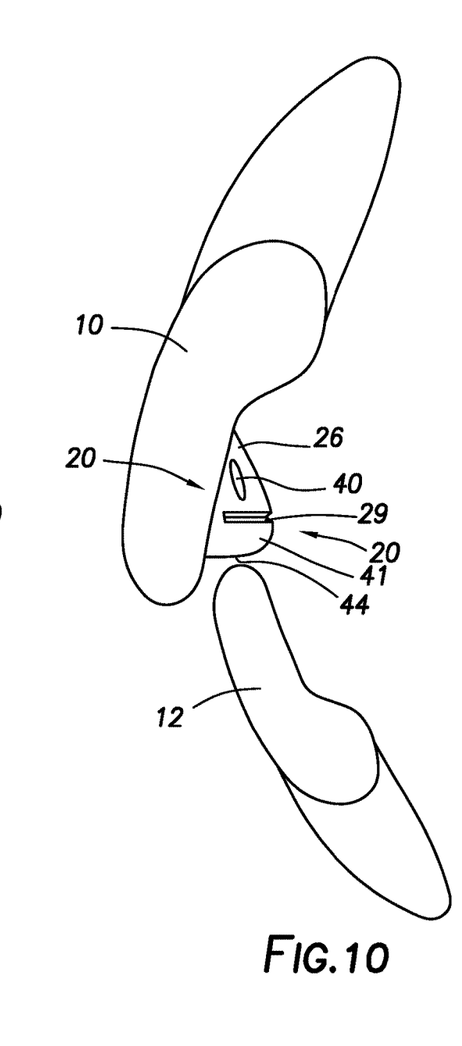
FIG. 10 is a left side view corresponding to FIG. 9, showing the bite plate 20 attached to an upper tooth 10 for limiting upward movement of a lower tooth 12.
Figure 11:
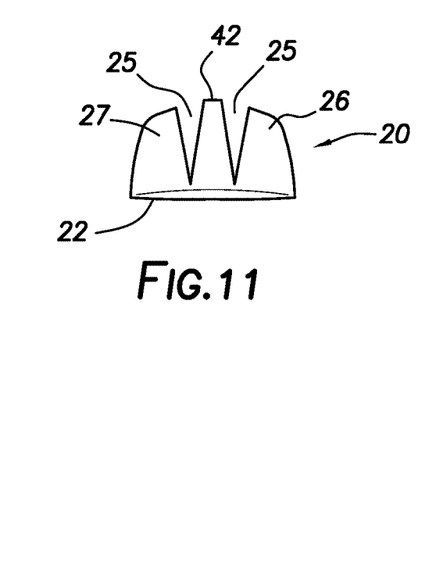
FIG. 11 is a top view of the bite plate 20 corresponding to FIGS. 9-10 showing the outward slanting lateral walls of the vertical channel 25.

FIGS. 9-11 show an alternative embodiment of the present invention with an occlusal stop 41 that is separate from the lateral wings 26, 27. In this embodiment, the vertical channel 25 does not extend completely through the body of the bite plate 20. FIG. 9 is a rear view of an alternative embodiment of this bite plate 20 attached to a tooth 10. FIG. 10 is a left side view corresponding to FIG. 9, showing the bite plate 20 attached to an upper tooth 10 to limit upward movement of a lower tooth 12 as the mandible is closed.

In this embodiment, an occlusal stop 41 extends lingually from the base 22 and runs across the width of the bite plate 20, so that its incisal surface 44 is continuous without a separation for the vertical channel 25. As before, the incisal surface 44 of the occlusal stop 41 limits upward movement of the patient's lower incisor 12, as shown in FIG. 10. This configuration provides increased comfort for the tongue by eliminating the gap and edges in the incisal surface 44 that would otherwise be created by the vertical channel 25.

As before, a substantially vertical channel 25 divides the lingual aspect of the body of the bite plate 20 gingival to the occlusal stop 41 into two opposing lateral wings 26, 27 that extend lingually from the base of the bite plate 20. At least one substantially horizontal channel 29 runs across the lingual aspect of the body of the bite plate 20 to separate the occlusal stop 41 from the lateral wings 26, 27.

Optionally, the occlusal stop 41 can include a vertical member 42 that extends gingivally (upward) on the posterior aspect of the body of the bite 20. The vertical member 42 serves to reinforce and provide structural rigidity to the occlusal stop 41. This helps to prevent forces exerted by the patient's lower teeth 12 on the occlusal stop 41 from inadvertently deforming the occlusal stop 41 or debonding the base 22 of the bite plate 20 from the surface of the upper tooth 10. The vertical member 42 can extend into the vertical channel 25 between the lateral wings 26, 27, as shown in FIG. 9. In this embodiment, the occlusal stop 41 has a shape resembling an inverted T. The vertical channel 25 intersects with both horizontal channels 29 to define substantially L-shaped separations between the occlusal stop 41 and the lateral wings 26, 27.

It should be noted that these channels 25, 29 maintain a high degree of structural isolation between the occlusal stop 41 and the lateral wings 26, 27 so that forces exerted on the occlusal stop by the lower teeth 12 do not deform the lateral wings 26, 27. In addition, the lateral wings 26, 27 can be more easily compressed together using pliers to debond the bite plate 20, without having to deform the occlusal stop 41.

In the preferred embodiment, the vertical channel 25 diverges in the vertical plane toward the occlusal aspect of the bite plate 20 at an angle of about 10-20 degrees, as depicted in FIG. 9. Also, the lateral walls of the vertical channel 25 diverge (or slant outward) in the horizontal plane at an angle of about 10-20 degrees, as shown in FIG. 11. These features allow a greater range of motion by the lateral wings 26, 27 as they are compressed together into the vertical channel 25, and so makes it easier to lift the base 22 away from the tooth 10. Preferably, the horizontal channels 29 have parallel horizontal lateral walls.

Indentations or dimples 40 in the lateral wings 26, 27 provide convenient points of contact for pliers to engage the lateral wings 26, 27. As before, pliers can be used to compress the lateral wings 26, 27 together into the space occupied by the vertical channel 25 by exerting a compressive lateral force. This deforms the base 22 and thereby releases the bite plate 20 from the tooth 10. Alternatively, protrusions or ridges in the lingual surfaces of the lateral wings 26, 27 could be substituted for indentations.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. An orthodontic bite plate comprising:
    an anterior base for bonding attachment to the lingual surface of an upper anterior tooth of a patient;
    opposing, spaced-apart lateral wings extending lingually from the base;
    said spaced-apart lateral wings forming a substantially vertical channel between the lateral wings and exposing a portion of the base between the lateral wings, said vertical channel having lateral walls facing each other and extending along the vertical channel and exposing said portion of the base along the vertical channel between said lateral walls,
    an occlusal stop having an incisal surface extending lingually from the base to limit upward movement of the patient's lower teeth, said lateral wings being located gingivally with respect to the occlusal stop, said occlusal stop having a central, laterally extending portion spaced lingually from the lateral wings to create at least one substantially horizontal channel extending between the central portion of the occlusal stop and the lateral wings, said horizontal channel being open and remaining open when the bite plate is in use;
    wherein the occlusal stop further comprises a vertical member having walls facing outwardly of each other and extending gingivally from the occlusal stop into the vertical channel between and laterally spaced from the lateral walls of the vertical channel, said vertical member being attached to the exposed portion of the base between the lateral walls of the vertical channel, said vertical channel allowing the lateral wings to be compressed together by application of a lateral compressive force to deform the base including the exposed portion of the base between the lateral walls of the vertical channel with the vertical member of the occlusal stop still positioned between and laterally spaced from the lateral walls of the vertical channel and still attached to the exposed portion of the base between the lateral walls of the vertical channel to thereby release the orthodontic bite plate including the lateral wings, attached occlusal stop and vertical member thereof, and base from the tooth.

2. The orthodontic bite plate of claim 1 further comprising indentations in the lateral wings forming dimple depressions in the lateral wings for engaging pliers to compress the lateral wings.

3. The orthodontic bite plate of claim 1 wherein the lateral walls of the vertical channel diverge at an angle of about 10 to 20 degrees.

4. The orthodontic bite plate of claim 1 wherein the base further comprises a bonding pad for bonding attachment to the lingual surface of an upper anterior tooth.

5. The orthodontic bite plate of claim 1 wherein the occlusal stop limiting upward movement of the patient's lower teeth is permanently attached to the base.

6. An orthodontic bite plate comprising:
    an anterior base for bonding attachment to the lingual surface of an upper anterior tooth of a patient;
    spaced-apart, opposing lateral wings extending lingually from the base;
    said spaced-apart lateral wings forming a substantially vertical channel between the lateral wings, said vertical channel having lateral walls facing each other and extending along the vertical channel;
    an occlusal stop having:
    (a) an incisal surface extending lingually from the base and located occlusally to the lateral wings for limiting upward movement of the patient's lower teeth; and
    (b) a vertical member extending gingivally from the occlusal stop into the vertical channel between and laterally spaced from the lateral walls of the vertical channel; and
    at least one substantially horizontal channel extending between the occlusal stop and the lateral wings;
    said vertical channel allowing the lateral wings to be compressed together by application of a lateral compressive force to deform the base with the vertical member of the occlusal stop still positioned between and laterally spaced from the lateral walls of the vertical channel and thereby release the orthodontic bite plate including the lateral wings, occlusal stop and vertical member thereof, and base from the tooth.

7. The orthodontic bite plate of claim 6 further comprising indentations forming dimple depressions in the lateral wings in the lateral wings for engaging pliers to compress the lateral wings.

8. The orthodontic bite plate of claim 6 wherein the lateral walls of the vertical channel diverge in a vertical plane toward the occlusal stop.

9. The orthodontic bite plate of claim 6 wherein the lateral walls of the vertical channel slant outward in a horizontal plane.

10. The orthodontic bite plate of claim 9 wherein the lateral walls of the vertical channel slant outward at an angle of about 10 to 20 degrees.

11. The orthodontic bite plate of claim 6 wherein the base further comprises a bonding pad for bonding attachment to the lingual surface of an upper anterior tooth.

12. The orthodontic bite plate of claim 6 wherein said spaced-apart lateral wings expose a portion of the base between the lateral wings and extending along said vertical channel.

13. The orthodontic bite plate of claim 12 wherein said vertical member is attached to the exposed portion of the base, said vertical channel allowing the lateral wings to be compressed together by application of a lateral compressive force to deform the base including the exposed portion of the base between the lateral walls of the vertical channel with the vertical member still positioned between and laterally spaced from the lateral walls of the vertical channel and still attached to the exposed portion of the base between the lateral walls of the vertical channel to thereby release the orthodontic bite plate including the lateral wings, attached occlusal stop and vertical member thereof, and base from the tooth.

14. The orthodontic bite plate of claim 6 wherein the horizontal channel is open and remains open when the bite plate is in use.

15. The orthodontic bite plate of claim 6 wherein the occlusal stop limiting upward movement of the patient's lower teeth is permanently attached to said base.

16. An orthodontic bite plate comprising:
   an anterior base for bonding attachment to the lingual surface of an upper anterior tooth of a patient;
   opposing, spaced-apart lateral wings extending lingually from the base;
   at least one occlusal surface extending lingually from the base to provide an occlusal stop limiting upward movement of the patient's lower teeth;
   said spaced-apart lateral wings forming a substantially vertical channel between the lateral wings and exposing a portion of the base between the lateral wings and extending along said vertical channel,
   wherein the vertical channel has spaced-apart, lateral walls facing each other and the occlusal stop further comprises a vertical member extending gingivally from the occlusal stop into the vertical channel between and laterally spaced from the lateral walls of the vertical channel, said vertical channel allowing the lateral wings to be compressed together by application of a lateral compressive force to deform the base with the vertical member of the occlusal stop still positioned between and laterally spaced from the lateral walls of the vertical channel and thereby release the orthodontic bite plate including the lateral wings, attached occlusal stop and vertical member thereof, and base from the tooth.

17. The orthodontic bite plate of claim 16 wherein said lateral wings are located gingivally with respect to the occlusal stop and said occlusal stop has a central, laterally extending portion spaced lingually from the lateral wings to create at least one substantially horizontal channel extending between the central portion of the occlusal stop and the lateral wings, said horizontal channel being open and remaining open when the bite plate is in use.

18. The orthodontic bite plate of claim 16 further comprising indentations in the lateral wings forming dimple depressions in the lateral wings for engaging pliers to compress the lateral wings.

19. The orthodontic bite plate of claim 16 wherein the occlusal stop limiting upward movement of the patient's lower teeth is permanently attached to the base.

\* \* \* \* \*